UNITED STATES PATENT OFFICE.

VIKTOR VILLIGER AND ERNST FUSSENEGGER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

YELLOW AZO DYES.

990,173.  Specification of Letters Patent.  Patented Apr. 18, 1911.

No Drawing.  Application filed August 6, 1910. Serial No. 575,982.

*To all whom it may concern:*

Be it known that we, VIKTOR VILLIGER, Ph. D., and ERNST FUSSENEGGER, Ph. D., chemists, the first named a citizen of the Swiss Republic and the latter a subject of the Emperor of Austria-Hungary, residing at Ludwigshafen-on-the-Rhine, Germany, have invented new and useful Improvements in Yellow Dyes, of which the following is a specification.

Our invention relates to the manufacture of new azo coloring matters which are particularly suitable for use as pigments. We have discovered that by combining a diazotized chlorin derivative of ortho-nitranilin with aceto-acetarylid, yellow coloring matters can be obtained which are characterized by their insolubility in water and oil and their fastness against the action of light. They also possess the valuable property of not subliming. When used in the form of lakes, they possess brilliant greenish yellow shades. Our new coloring matters possess the further following characteristics. They are insoluble in water and when reduced by means of zinc dust in the presence of an excess of hot alcoholic alkali they give rise to a non-diazotizable acid which melts at about from 207–209° C. The coloring matter obtainable according to our invention from 4-chlor-2-nitranilin and aceto-acetanilid melts at about 246° C., and that obtainable from 5-chlor-2-nitranilin and aceto-acetanilid melts at about 236° C. As instances of aceto-acetarylids which can be employed according to our invention, we mention aceto-acetanilid, aceto-acetortho-toluidid, and aceto-acetpara-toluidid.

The following example will serve to illustrate further the nature of our invention and how it can be carried into practical effect, but our invention is not confined to this example. The parts are by weight. Diazotize in the usual manner seventeen and three-tenth parts of 4-chlor-2-nitranilin and allow the diazo solution to flow, while well stirring, into an aqueous solution of seventeen and seven-tenths parts of aceto-acetanilid, to which the necessary quantity of sodium acetate has been added. When the combination is complete, filter off the coloring matter, wash it with water, and either dry it or preserve it in the form of paste. In a similar manner the corresponding coloring matter can be obtained from 5-chlor-2-nitranilin.

Now what we claim is:—

1. As new articles of manufacture the azo coloring matters which can be obtained by combining a diazotized chlorin derivative of ortho-nitranilin with an aceto-acetarylid, which coloring matters possess yellowish colors, are insoluble in water, are fast against the action of light, and upon reduction with zinc dust in the presence of an excess of hot alcoholic alkali yield an undiazotizable acid which melts at about from two hundred and seven to two hundred and nine degrees centigrade.

2. As a new article of manufacture the azo coloring matter which can be obtained by combining diazotized 4-chlor-2-nitranilin with aceto-acetanilid, which coloring matter possesses a greenish yellow color, which is insoluble in water, is fast against the action of light, melts at about two hundred and forty-six degrees centigrade and upon reduction with zinc dust in the presence of an excess of hot alcoholic alkali yields an undiazotizable acid which melts at about from two hundred and seven to two hundred and nine degrees centigrade.

In testimony whereof we have hereunto set our hands in the presence of two subscribing witnesses.

VIKTOR VILLIGER.
ERNST FUSSENEGGER.

Witnesses:
 J. ALEC. LLOYD,
 ERNST L. IVES.